(12) United States Patent
Corrons

(10) Patent No.: US 6,355,584 B1
(45) Date of Patent: Mar. 12, 2002

(54) COMPLEX FABRIC HAVING LAYERS MADE FROM GLASS FIBERS AND TISSUE PAPER

(75) Inventor: José Corrons, Manresa (ES)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/341,831
(22) PCT Filed: Dec. 30, 1997
(86) PCT No.: PCT/EP97/07336
§ 371 Date: Mar. 20, 2000
§ 102(e) Date: Mar. 20, 2000
(87) PCT Pub. No.: WO98/29242
PCT Pub. Date: Jul. 9, 1998

(51) Int. Cl.[7] .................................................. D04H 1/74
(52) U.S. Cl. ...................... 442/367; 442/366; 442/412; 442/414; 442/103; 442/104; 442/172
(58) Field of Search ................................ 442/366, 367, 442/412, 414, 103, 104, 172

(56) References Cited

U.S. PATENT DOCUMENTS

| | | | |
|---|---|---|---|
| 3,490,983 A | * | 1/1970 | Lee ............................. 161/59 |
| 3,761,345 A | | 9/1973 | Smith |
| 4,348,450 A | | 9/1982 | Shaw |
| 4,499,134 A | | 2/1985 | Whitely et al. |
| 4,522,863 A | | 6/1985 | Keck et al. |
| 4,567,076 A | | 1/1986 | Therrien |
| 4,681,792 A | | 7/1987 | Harpell et al. |
| 4,746,565 A | | 5/1988 | Bafford et al. |
| 4,759,981 A | | 7/1988 | Weil |
| 4,900,614 A | | 2/1990 | Miyazato et al. |
| 4,911,973 A | | 3/1990 | Dunbar |
| 4,943,465 A | | 7/1990 | Bailey et al. |
| 4,983,453 A | | 1/1991 | Beall |
| 5,318,844 A | | 6/1994 | Brandon |
| 5,391,425 A | | 2/1995 | Isley, Jr. et al. |
| 5,401,588 A | | 3/1995 | Garvey et al. |
| 5,437,766 A | | 8/1995 | Van Phan et al. |
| 5,910,458 A | * | 6/1999 | Beer et al. ................... 442/367 |

FOREIGN PATENT DOCUMENTS

| | | |
|---|---|---|
| FR | 2124136 A | 9/1972 |
| TW | 305004 | 5/1997 |

OTHER PUBLICATIONS

PCT Search Report dated Apr. 29, 1998.
Derwent report dated Aug. 25, 1999.

* cited by examiner

Primary Examiner—Cheryl A. Juska
Assistant Examiner—Norca L. Torres
(74) Attorney, Agent, or Firm—Inger H. Eckert; Stephen W. Barns

(57) ABSTRACT

A multi-layer fabric is prepared from a chopped glass-fiber strand mat, at least one layer of continuous glass-fiber rovings and a porous tissue-paper backing. The tissue paper is disposed on a first lateral surface of the chopped-strand mat. The roving layer(s) overlay an opposed lateral surface of the mat. The layers are stitch-bonded together to form a complex fabric having advantageous resin wet-out when used as a reinforcement in a composite product.

18 Claims, 2 Drawing Sheets

COMPLEX FABRIC HAVING LAYERS MADE FROM GLASS FIBERS AND TISSUE PAPER

FIELD AND INDUSTRIAL APPLICABILITY OF THE INVENTION

The present invention relates generally to complex fabrics comprising a chopped glass-fiber strand mat. The complex fabrics further include one or more layers of continuous glass-fiber rovings and a tissue-paper backing layer supporting the chopped-strand mat. The various layers are stitch-bonded together to form the complex fabric.

The fabrics may be used in a variety of applications, e.g., as reinforcing components in plastic molded parts or composite products. For example, the inventive fabrics may be wetted out or impregnated with suitable resins to manufacture poles (e.g., light or telecommunication poles), baths and lavatories, automobile and van roofs, profiles, bumpers, engine covers, blades (e.g., for windmills), and skis and snowboards.

BACKGROUND OF THE INVENTION

Complex fabrics comprising layers of glass-fiber rovings are generally known in the industry. For example, the use of glass fibers in paper-making has long been known (see. e.g., U.S. Pat. No. 5,318,844 to Brandon). High-temperature resistant fibers have been made into flexible fabrics or papers which provide dimensional stability, fire resistance, and flexural strength. These papers have been made using conventional paper-making production equipment where staple fibers are laid in uniform layers, consolidating the fiber layers into a paper or fabric.

These multi-layer, complex fabrics are usually supported by a chopped-strand mat comprising a layer of randomly-laid strands of glass fibers. Many known processes for making the chopped-strand mat require using a binder, adhesive, glue, or other moisture-containing paste to join the fibers and form the chopped-strand mat. These processes require a step of drying or curing the binder, adhesive, glue, or paste. Thus, such processes involve the use of additional material and require additional time in producing a complex fabric.

A variety of complex or composite fabrics are known. U.S. Pat. No. 4,499,134 to Whitely et al. discloses a composite comprising a paper, which has a thickness of about 0.01 inch to 0.05 inch (about 0.254 mm to 1.27 mm) and a bulk density of between 5 and 15 lb./ft$^3$ (80.092 and 240.277 kg/m$^3$), and an abrasion-resistant, high-temperature scrim, which may be composed of fibers such as glass fibers, disposed on one or more surfaces of the paper. U.S. Pat. No. 4,983,453 to Beall discloses a composite pultruded product made from glass roving strands and a cellulosic mat having a basis weight generally falling between about 100 g/m$^2$ and 800 g/m$^2$.

Although various complex fabric materials are known, there is a need for complex fabrics having enhanced wetting out or impregnation by resin when used to manufacture reinforced composite products. Additionally, there is a need for relatively low-cost fabrics having advantageous wet-out and impregnation properties.

Furthermore, there exists a need for an improved complex fabric that eliminates the need for binders, adhesives, or pastes in forming a chopped-strand mat which supports the multiple layers of the complex fabric. There is also a need for a process for making such multi-layer complex fabrics which eliminates a drying or curing step during the making of the chopped-strand mat for the complex fabric.

SUMMARY OF THE INVENTION

An object of the invention is therefore to achieve a complex fabric having improved wet-out that may be made at a low cost. Another object is to provide a method of making a multi-layer complex fabric wherein the mat is made without the need for drying or curing.

Such objects are achieved by the complex fabric of the present invention, which comprises a chopped glass fiber or strand mat, a tissue-paper backing layer, and at least one layer of glass-fiber rovings, which are preferably made from continuous fibers. The chopped glass fiber strand mat has two lateral surfaces and comprises randomly laid and oriented glass-fiber strands. The tissue-paper backing layer is disposed on a first lateral surface of the chopped-strand mat, supporting the mat. The chopped-strand mat preferably contains essentially no adhesive, binder, paste, or glue. Each roving layer preferably includes a plurality of glass-fiber rovings arranged in a unidirectional fashion along an axis of the complex fabric. The glass-roving layers overlay an opposed lateral surface of the chopped-strand mat. The various layers of the complex fabric, i.e., the tissue-paper backing, chopped-strand mat, and glass roving layer(s), are stitch-bonded together to form the complex fabric.

A preferred embodiment of a method for making a multi-layer complex fabric of the present invention comprises providing a tissue-paper backing layer and laying chopped glass-fiber strands over the tissue-paper layer in a randomly laid and oriented fashion, thereby forming a chopped-strand mat over a lateral surface of the tissue-paper backing layer. Next, continuous glass-fiber rovings are laid onto the chopped-strand mat, forming a roving layer, and then the tissue-paper backing layer, chopped-strand mat, and glass-fiber roving layers are stitched together to form the complex fabric.

An advantageous feature of the inventive fabric is improved wet-out and impregnation by polymer resin when used as a reinforcement in the manufacture of composite products. The resin more readily wets out and impregnates the complex fabric because the tissue-paper layer enhances the absorbency of the fabric as a whole. Moreover, holes formed in the fabric by the stitching, as well as openings between the chopped glass fibers in the mat, help enhance resin impregnation. Additionally, a cost reduction is achieved through the use of a low-cost backing material. In comparison, known materials used as backings for glass-fiber mat or complex fabrics are not only more costly, but provide no improvement in wet-out performance.

These and other advantages, objects, and features of the present invention will be apparent from the following detailed description in conjunction with the attached drawings.

DETAILED DESCRIPTION AND PREFERRED EMBODIMENTS OF THE INVENTION

The complex fabric of the present invention includes various layers stitch-bonded together to form a unitary product. The layers include a chopped glass-fiber mat, one or more layers of continuous glass-fiber rovings, and a tissue-paper backing. The complex fabric has a multitude of uses, but has particular applicability in making a composite product from a thermoplastic or thermoset resin where the fabric forms a support, reinforcement, or base for a plastic product in a manner well known in the art.

Figure 1:
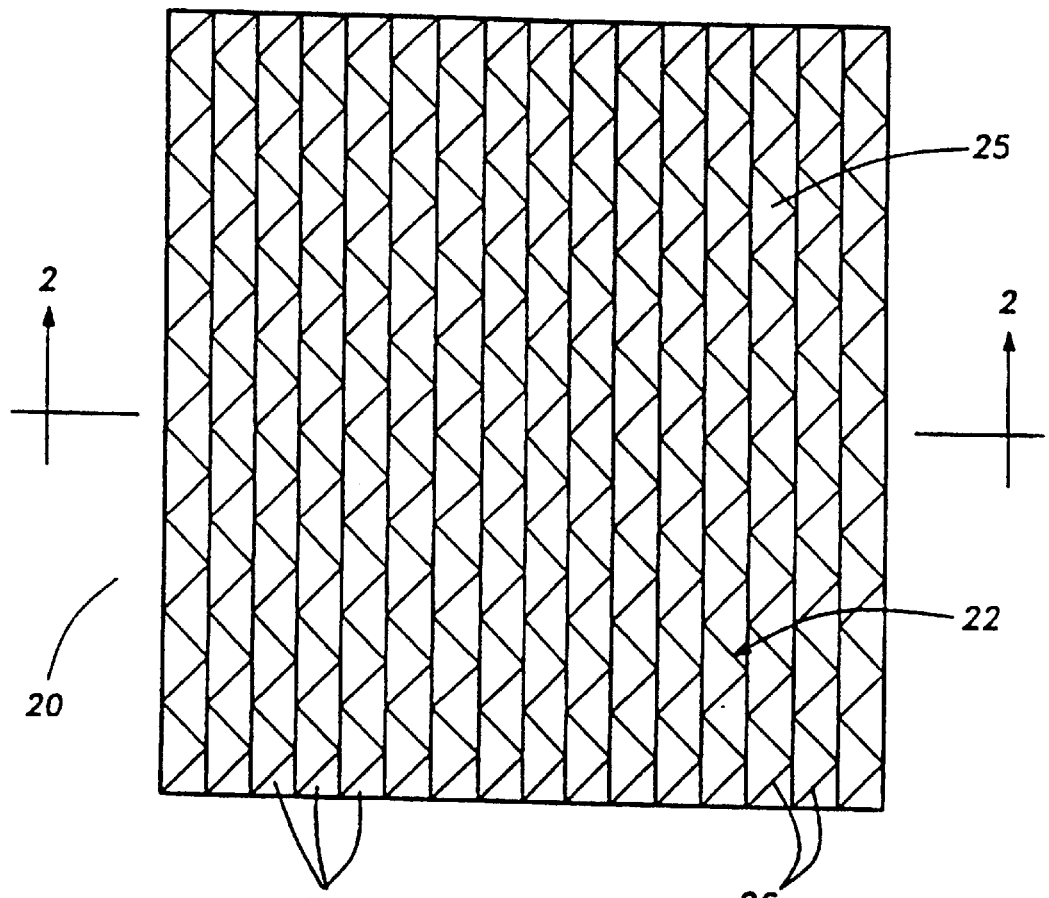
FIG. 1 is a top plan view of a multi-layer complex fabric according to the invention.

Referring to the drawing figures, wherein like numerals indicate like corresponding parts throughout the several views, a preferred embodiment of a complex fabric 20 according to the present invention is generally shown. The complex fabric 20 includes a plurality of layers, including top glass-fiber roving layer 22 and glass-fiber roving layers 28, 30, 32. The complex fabric 20 also includes a chopped-fiber strand mat layer 34 and a tissue-paper backing layer 36. The various layers of the complex fabric 20 are stitch-bonded together using sewing threads 26, shown in a preferred zigzag pattern in FIG. 1. A top layer 22 includes a multiplicity of glass-fiber rovings 24 arranged in a uni-directional fashion. Each roving 24 includes a multiplicity of glass-fiber filaments 23 gathered together into an approximately parallel arrangement without twist.

Figure 2:
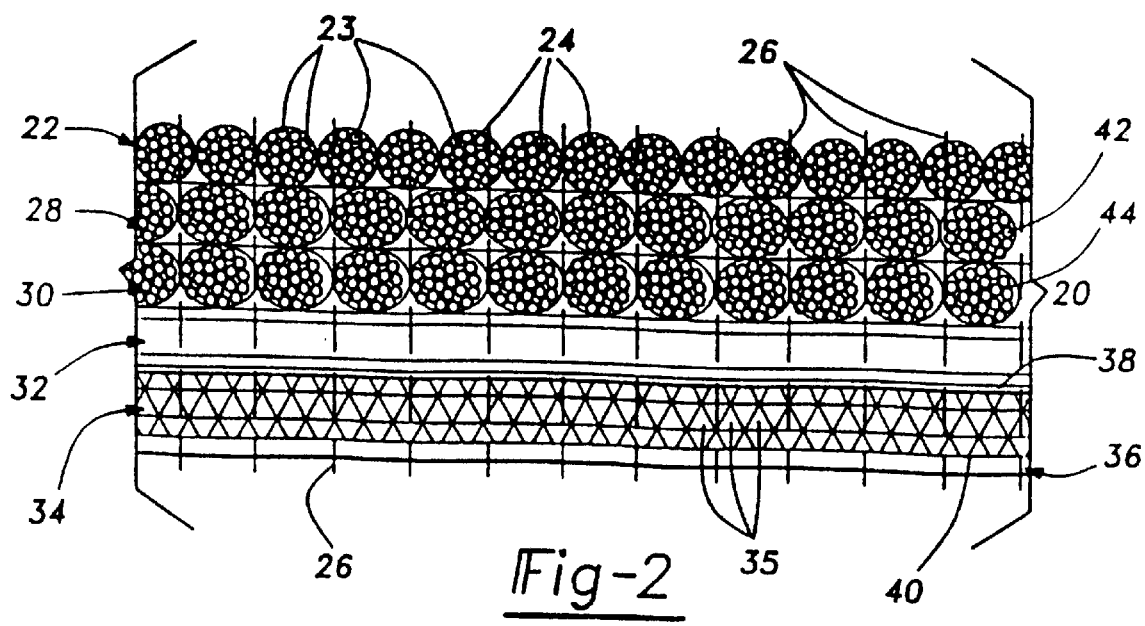
FIG. 2 is a cross-sectional view of the complex fabric of FIG. 1 along view line 2—2.
Figure 3:
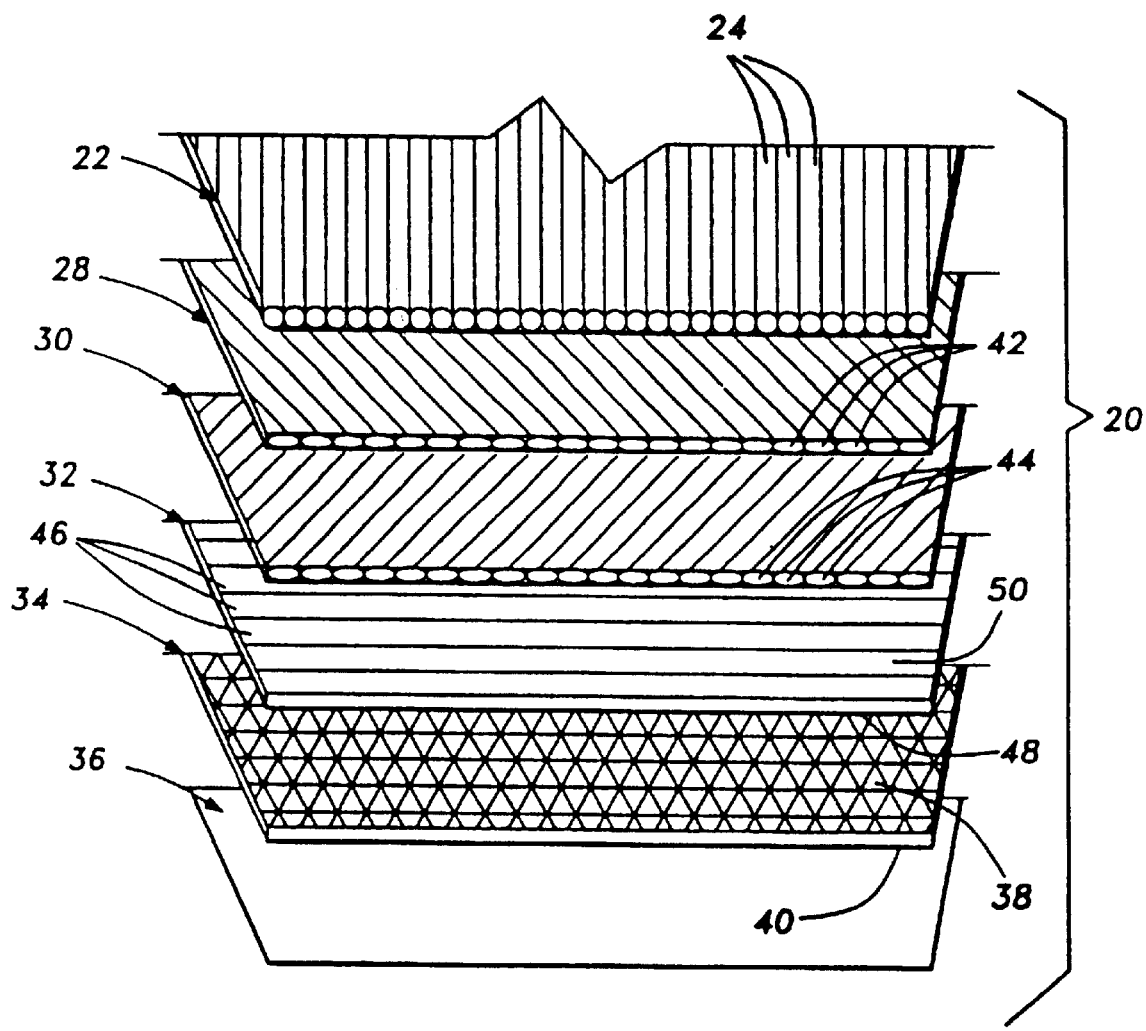
FIG. 3 is a partial, exploded, perspective view of the complex fabric of FIG. 1.

Chopped-strand mat 34 includes a layer of randomly laid and oriented glass-fiber strands 35, which are schematically shown in FIGS. 2 and 3. The strands 35 may be laid using a conventional dry-lay process, as described below. Glass-fiber strands 35 interlock to form the mat 34. The chopped-strand mat 34 preferably contains essentially no adhesive, binder, paste, or glue. Mat 34 is lightweight, yet provides a support for the glass-fiber roving layers 22, 28, 30, 32. Preferably, mat 34 has a thickness of from about 0.50 millimeter (mm) to about 3.00 mm, more preferably from about 1 mm to about 2 mm and has a bulk density of from about 0.040 pounds per cubic inch (lb./in$^3$) to about 0.080 lb./in$^3$ (1.11–2.21 g/cm$^3$). Chopped-strand mat 34 has opposed lateral surfaces 38 and 40, upon which additional layers are disposed as described below.

The glass-fiber strands 35 or filaments forming the chopped-strand mat 34 comprise glass fibers of a suitable type known in the art, e.g., roving chopped into different lengths or Cosmostrand (single-end direct multicompatible roving) chopped into different lengths. Exemplary chopped-strand mats that may be used in the present invention are available from Owens Corning and from several other sources. The fibers 35 may be either in staple or continuous form. For example, one method of manufacturing chopped-strand mat 34 involves extruding glass fiber in a continuous-filament form, and allowing the continuous filament to interlock and intertwine. Similarly, the mat 34 can be formed from staple filaments which are randomly arranged and oriented.

A tissue-paper backing layer 36 is disposed on a lower lateral surface 40 of chopped-strand mat 34. Backing 36 provides a support for the glass-fiber strands 35 and mat 34, particularly in a process of making the complex fabric 20 described below. The tissue-paper backing layer 36 comprises a standard tissue-paper product having a bulk weight of about 20 grams/meter$^2$ (g/m$^2$) to about 60 g/m$^2$, more preferably from about 20 g/m$^2$ to about 35 g/m$^2$. Most preferably, the tissue-paper backing layer has a bulk weight of 25 g/m$^2$. A conventional or standard tissue paper that is relatively porous and may be formed by conventional processes from wood, plant, or rag fibers is preferably used to form the backing layer 36. Suitable tissue papers are available from Errebi Paper Srl (Cuneo, Italy) and other suppliers. The tissue-paper backing is used in the formation of the complex fabric of the present invention, but it is not required to impart structural integrity to the fabric in use. Thus, this layer may be partially or completely destroyed in a high-temperature application, for example, without adversely affecting the performance of the fabric. Tissue-paper backing 36 preferably supports chopped-strand mat 34 such that mat 34 may be made without any adhesive, binder, paste, or glue.

Glass-fiber roving layer 22 includes a plurality of rovings 24. Each roving 24 includes a plurality of glass fibers 23 gathered together into an approximately parallel arrangement, generally without twist. Rovings 24 are aligned in a uni-directional fashion along a longitudinal axis of complex fabric 20. Thus, each roving 24 is generally parallel with each of the other rovings 24. Consequently, glass-fiber roving layer 22 enhances strength along the longitudinal axis of complex fabric 20. Glass-fiber strands 23 may be in either staple or continuous form. In manufacturing glass-fiber roving layer 22, glass fibers 23 may be extruded in a continuous-filament form. The glass fibers may be combined with a plurality of other glass fibers in a conventional manner. The glass fiber strands are preferably bundled to form a glass-fiber roving 24. Alternatively, staple fibers of a short, uniform length may be formed into a glass-fiber rovings layer by a conventional wet- or dry-lay process.

Glass-fiber roving layer 28 is similar to roving layer 22. However, rovings 42 in layer 28 are arranged in a uni-directional fashion at an angle approximately +45° from the longitudinal axis of complex fabric 20. A plurality of glass-fiber strands 23 are bundled in an approximately parallel arrangement without twist, forming rovings 42 of layer 28. Glass-fiber rovings 42 provide strength to the complex fabric 20 along the direction of rovings 42, i.e., along an axis at about +45° from the longitudinal axis of complex fabric 20.

In glass-fiber roving layer 30, rovings 44 are arranged in a uni-directional fashion approximately −45° from the longitudinal axis of complex fabric 20. Thus, rovings 44 in layer 30 are essentially perpendicular to rovings 42 in layer 28. Glass-fiber rovings layer 30 provides strength to complex fabric 20 along an axis at about −45° from the longitudinal axis of complex fabric 20.

Glass-fiber roving layer 32 includes a plurality of rovings 46 arranged in a uni-directional fashion substantially perpendicular to the longitudinal axis of complex fabric 20. Each roving 46 includes a multiplicity of glass-fiber strands 23 bundled in an approximately parallel arrangement without twist. Glass-fiber roving layer 32 provides strength to complex fabric 20 along an axis perpendicular to the longitudinal axis of complex fabric 20.

Preferably, each glass-fiber roving layer 22, 28. 30, 32 has a thickness of from about 0.50 mm to about 3.00 mm, more preferably from about 1 mm to about 2 mm. Roving layers 22, 28, 30, 32 overlay opposed lateral surface 38 of chopped-strand mat 34. Specifically, a lower lateral surface 48 of roving layer 32 abuts upper lateral surface 38 of chopped-strand mat 34. Roving layer 30 overlays upper lateral surface 50 of roving layer 32. Roving layer 28 overlays roving layer 30, and roving layer 22 overlays roving layer 28. The various glass-fiber roving layers may be arranged in any desired order suitable for the intended design. Further, complex fabric 20 may include more or less than the illustrated number of four roving layers 22, 28, 30, 32. At least one roving layer is typically included in complex fabric 20 to provide additional strength and integrity to the complex fabric 20.

The various layers of complex fabric 20 (in the illustrated embodiment, top glass-fiber roving layer 22, glass-fiber roving layers 28, 30, 32, chopped-strand mat 34, and tissue-paper backing layer 36) are bonded together by stitching to form a unitary product. Sewing threads 26 pass from an upper face of complex fabric 20 through the various layers to a lower face of the fabric 20 in any suitable sewing or stitching pattern. Sewing threads 26 may comprise the same material as the filaments in the rovings, i.e., glass fibers. Sewing threads 26, however, preferably comprise a polymeric material such as a polyamide, polyester, or polypropylene material. Suitable sewing threads are available from various suppliers, such as La Seda de Barcelona (Barcelona, Spain). In a preferred embodiment, sewing threads 26 form a zigzag pattern. In such a zigzag pattern, sewing threads 26 cross over rovings 24 on an upper face 25 of layer 22 in an alternating diagonal fashion. Threads 26 pass through complex fabric 20 between the individual glass-fiber rovings 24 of layer 22. Complex fabric 20 is a lightweight, self-supporting product having enhanced strength in the directions of the glass-fiber roving layers 22, 28, 30, 32.

In a preferred method, the complex fabric 20 incorporating the various layers is formed as follows. A layer of tissue paper 36 is first laid, preferably on a support surface (not shown). The method then comprises laying down, in succession, a generally uniform layer of chopped glass-fiber strands 35 over the tissue-paper layer 36, thereby forming a chopped-strand mat 34 over a lateral surface of the tissue-paper backing 36. The chopped-strand fibers 35 are disposed in a randomly laid and oriented fashion. The tissue-paper layer 36 forms a support or backing for the glass-fiber strands 35, thereby eliminating the need for any binder, paste, or glue in preparing the chopped-strand mat 34. A plurality of glass-fiber rovings 46 are then laid over the mat 34, forming a first glass-fiber roving layer 32 thereover. The rovings 46 are laid in a uni-directional fashion substantially perpendicular to the longitudinal axis of the complex fabric. Each roving 46 includes a multiplicity of filaments or fibers 23 gathered together into an approximately parallel arrangement without twist. An additional layer of glass-fiber rovings 30 may then be laid over the first layer of rovings 32 in substantially the same way as the first layer, e.g., in a uni-directional fashion along another axis, e.g., perpendicular to the longitudinal axis of the complex fabric. Additional layers of glass-fiber rovings 22, 28 may similarly be laid in succession over the previous roving layers along different axes as desired. The various layers are then stitched together with thread in a suitable manner to form the complex fabric.

Preferred embodiments and aspects of the invention has been described. Those of ordinary skill in the art will recognize that various modifications may be made without departing from the spirit of the invention. Thus, the invention is intended not to be limited by the detailed description above, but to be defined by the appended claims and their equivalents.

What is claimed is:

1. A fabric comprising:
    (a) a plurality of layers comprising:
        a chopped-strand mat having a first lateral surface and a second lateral surface opposed to the first lateral surface, the chopped-strand mat comprising a layer of randomly laid, chopped glass-fiber strands;
        a first roving layer of glass-fiber rovings overlaying the first lateral surface of said chopped-strand mat wherein said first roving layer is arranged along the longitudinal axis of said fabric;
        a second roving layer of glass-fiber rovings overlaying said first roving layer and arranged at an angle of about −45° from the longitudinal axis;
        a third roving layer of glass-fiber rovings overlaying said second roving layer and arranged at an angle of about +45° from the longitudinal axis; and
        a fourth roving layer of glass-fiber rovings overlaying said third roving layer and arranged perpendicular to the longitudinal axis;
        a porous tissue-paper backing having a bulk weight of from about 20 grams/meter$^2$ to about 60 grams/meter$^2$ disposed on the second lateral surface of said chopped-strand mat to support said chopped-strand mat; and
    (b) stitched thread bonding together said plurality of layers.

2. A fabric as recited in claim 1, wherein the chopped-strand mat consists essentially of said chopped glass-fiber strands.

3. A fabric as recited in claim 1, wherein said bulk weight of the tissue-paper backing is about 25 grams/meter$^2$.

4. A fabric as recited in claim 1, wherein said first roving layer comprises a layer of continuous, uni-directional glass-fiber rovings arranged along a first axis of the fabric.

5. A fabric as recited in claim 4, wherein:
    said first axis is the longitudinal axis; and
    said plurality of layers further comprises a second roving layer overlaying said first roving layer and comprising continuous glass-fiber rovings arranged in a parallel, unidirectional fashion along a second axis of the fabric different from the first axis.

6. A fabric as recited in claim 1, wherein said chopped-strand mat comprises an essentially uniform layer of chopped glass-fiber strands randomly laid and oriented.

7. A fabric as recited in claim 1, wherein said chopped-strand mat comprises a layer of randomly laid and oriented glass filament strands, and said bulk weight of the tissue-paper backing is about 25 grams/meter$^2$.

8. A fabric as recited in claim 1, wherein said stitched thread is sewn in a zigzag pattern and said thread is formed from a polymeric material.

9. A composite product comprising:
    (a) a reinforcing fabric comprising:
        (i) a plurality of layers comprising: a chopped-strand mat having a first lateral surface and a second lateral surface opposed to the first lateral surface, the chopped-strand mat comprising a layer of randomly laid, chopped glass-fiber strands; a first roving layer of glass-fiber rovings overlaying the first lateral surface of said chopped-strand mat wherein said first roving layer is arranged along the longitudinal axis of the fabric, a second roving layer of glass-fiber rovings overlaying said first roving layer and arranged at an angle of about −45° from the longitudinal axis; a third roving layer of glass-fiber rovings overlaying said second roving layer and arranged at an angle of about +45° from the longitudinal axis; a fourth roving layer of glass-fiber rovings overlaying said third roving layer and arranged perpendicular to the longitudinal axis; and a porous tissue-paper backing having a bulk weight of from about 20 grams/meter$^2$ to about 60 grams/meter$^2$ disposed on the second lateral surface of said chopped-strand mat to support said chopped-strand mat; and
        (ii) stitched thread bonding together said plurality of layers; and
    (b) a polymeric resin impregnating said reinforcing fabric.

10. A composite product as recited in claim 9, wherein said bulk weight of the tissue-paper backing is about 25 grams/meter$^2$.

11. A composite product as recited in claim 9, wherein said first roving layer comprises a layer of continuous, unidirectional glass-fiber rovings arranged along a first axis of the fabric.

12. A composite product as recited in claim 11, wherein said first axis is the longitudinal axis, and said plurality of layers further comprises a second roving layer overlaying said first roving layer, said second roving layer comprising continuous glass-fiber rovings arranged in a parallel, uni-directional fashion along a second axis of the fabric different from the first axis.

13. A composite product as recited in claim 9, wherein said chopped-strand mat consists essentially of a layer of randomly laid and oriented glass filament stands, and said bulk weight of the tissue-paper backing is about 25 grams/meter$^2$.

14. A method of making a fabric comprising the steps of:
 (a) forming a plurality of layers by steps comprising:
  (i) laying chopped glass fibers in a randomly laid and oriented fashion over a lateral surface of a porous tissue-paper backing having a bulk weight of from about 20 grams/meter$^2$ to about 60 grams/meter$^2$ to form a chopped-strand mat;
  (ii) laying glass-fiber rovings over said chopped-strand mat to form a first roving layer wherein said first roving layer is arranged along the longitudinal axis of said fabric;
  (iii) laying a second roving layer of glass-fiber rovings overlaying said first roving layer and arranged at an angle of about 45° from the longitudinal axis;
  (iv) laying a third roving layer of glass-fiber rovings overlaying said second roving layer and arranged at an angle of about +45° from the longitudinal axis; and
  (v) laying a fourth roving layer of glass-fiber rovings overlaying said third roving layer and arranged perpendicular to the longitudinal axis; and
 (b) stitching said plurality of layers together with thread to form the fabric.

15. A method as recited in claim 14, wherein-said laying of chopped glass fibers is performed so that said chopped-strand mat has an essentially uniform thickness.

16. A method as recited in claim 14, wherein said glass-fiber rovings are continuous and laid uni-directionally over said chopped-strand mat along a first axis of the fabric.

17. A method as recited in claim 14, wherein said forming further comprises (iii) laying a second roving layer of continuous glass-fiber rovings uni-directionally over said first roving layer along a second axis different from the first axis.

18. A method as recited in claim 14, wherein the step of laying chopped glass fibers to form the chopped-strand mat is performed without using any adhesive, binder, paste, or glue.

\* \* \* \* \*